United States Patent  [19]
// Asami et al.

(12) United States Patent
Asami et al.

(10) Patent No.: US 7,432,410 B2
(45) Date of Patent: Oct. 7, 2008

(54) PRODUCTION OF LPG CONTAINING PROPANE OR BUTANE FROM DIMETHYL ETHER OR METHANOL

(75) Inventors: Kenji Asami, Fukuoka (JP); Kaoru Fujimoto, Fukuoka (JP); Sachio Asaoka, Fukuoka (JP); Xiaohong Li, Fukuoka (JP)

(73) Assignee: Japan Gas Synthesize, Ltd., Toranomon, Minato-Ku, Tokyo (JP)

( * ) Notice: Subject to any disclaimer, the term of this patent is extended or adjusted under 35 U.S.C. 154(b) by 605 days.

(21) Appl. No.: 10/929,987

(22) Filed: Aug. 30, 2004

(65) Prior Publication Data

US 2006/0036122 A1    Feb. 16, 2006

(30) Foreign Application Priority Data

Aug. 11, 2004    (JP)    ............... 2004-234498

(51) Int. Cl.
*C07C 1/20*    (2006.01)
*C07C 1/04*    (2006.01)

(52) U.S. Cl. ..................................... 585/733
(58) Field of Classification Search ............ 585/733
See application file for complete search history.

(56) References Cited

FOREIGN PATENT DOCUMENTS

| EP | 0 211 228 A1 | 2/1987 |
|---|---|---|
| JP | 61-23688 | 2/1986 |
| JP | 62-11548 | 1/1987 |
| JP | 62-209031 | 9/1987 |
| JP | 04-363142 | 12/1992 |
| JP | 5-504904 | 7/1993 |
| JP | 05-253486 | 10/1993 |
| JP | 06-279012 | 10/1994 |
| JP | 07-157304 | 6/1995 |
| JP | 08-245211 | 9/1996 |
| JP | 09-157197 | 6/1997 |
| JP | 09-249595 | 9/1997 |
| JP | 2000-176287 | 6/2000 |
| JP | 2001-079398 | 3/2001 |
| JP | 2003-027064 | 1/2003 |
| WO | WO 91/00144 | 1/1991 |

OTHER PUBLICATIONS

Sep. 13, 2006, Office Action from corresponding Japanese application Serial No. 2004-234498.
Dec. 6, 2006, Office Action from corresponding Japanese application Serial No. 2004-234498.
Kaoru Fujimoto, et al., Selective Synthesis of LPG from Synthesis Gas, The Chemical Society of Japan, Oct. 1985 vol. 58 No. 10, pp. 3059-3060.
O. Yingjie Jin, et al., Methanol/Dimethyl Ether Conversion on Zeolite Catalysts for Indirect Synthesis of LPG from Natural Gas, The University of Kitakyushu, Environmental Engineering, 2003.
Journal of the High Pressure Gas Safety Institute of Japan, vol. 39, No. 7, pp. 25-30 (2002).

*Primary Examiner*—Thuan Dinh Dang
(74) *Attorney, Agent, or Firm*—Knobbe Martens Olson & Bear LLP

(57) ABSTRACT

At least one selected from the group consisting of methanol and dimethyl ether, and hydrogen are reacted in the presence of a catalyst for producing a liquefied petroleum gas in which an olefin-hydrogenation catalyst component is supported on a zeolite, to produce a hydrocarbon containing propane or butane as a main component, i.e., a liquefied petroleum gas.

12 Claims, 1 Drawing Sheet

PRODUCTION OF LPG CONTAINING PROPANE OR BUTANE FROM DIMETHYL ETHER OR METHANOL

TECHNICAL FIELD

This invention relates to a process for producing a liquefied petroleum gas containing propane or butane as a main component by reacting at least one selected from the group consisting of methanol and dimethyl ether with hydrogen.

This invention also relates to a process for producing a liquefied petroleum gas containing propane or butane as a main component from a synthesis gas, via methanol and/or dimethyl ether. This invention also relates to a process for producing a liquefied petroleum gas containing propane or butane as a main component from a carbon-containing starting material such as a natural gas, via methanol and/or dimethyl ether.

BACKGROUND OF THE INVENTION

Liquefied petroleum gas (LPG) is a liquefied petroleum-based or natural-gas-based hydrocarbon which is gaseous at an ambient temperature under an atmospheric pressure by compression while optionally cooling, and the main component of it is propane or butane. LPG is advantageously transportable because it can be stored or transported in a liquid form. Thus, in contrast with a natural gas that requires a pipeline for supply, it has a characteristic that it can be filled in a container to be supplied to any place. For that reason, LPG comprising propane as a main component, i.e., propane gas has been widely used as a fuel for household and business use. At present, propane gas is supplied to about 25 million households (more than 50% of the total households) in Japan. In addition to household and business use, LPG is used as a fuel for a portable product such as a portable gas burner and a disposable lighter (mainly, butane gas), an industrial fuel and an automobile fuel.

Conventionally, LPG has been produced by 1) collection from a wet natural gas, 2) collection from a stabilization (vapor-pressure regulating) process of crude petroleum, 3) separation and extraction of a product in, for example, a petroleum refining process, or the like.

LPG, in particular propane gas used as a household/business fuel, can be expected to be in great demand in the future. Thus, it may be very useful to establish an industrially practicable and new process for producing LPG.

As a process for producing LPG, Japanese Patent Laid-open Publication No. 61-23688 discloses that a synthesis gas consisting of hydrogen and carbon monoxide is reacted in the presence of a mixed catalyst obtained by physically mixing a methanol synthesis catalyst such as a Cu—Zn-based catalyst, a Cr—Zn-based catalyst and a Pd-based catalyst, specifically a CuO—ZnO—$Al_2O_3$ catalyst or a Pd/$SiO_2$ catalyst with a methanol conversion catalyst composed of a zeolite having an average pore size of about 10 Å (1 nm) or more, specifically a Y-type zeolite, to give a liquefied petroleum gas or a mixture of hydrocarbons similar in composition to LPG.

However, the process described in the above-mentioned Japanese Patent Laid-open Publication No. 61-23688 does not always give a sufficiently high activity (a conversion of carbon monoxide), a sufficiently high yield of a hydrocarbon, and a sufficiently high yield of propane and butane. A yield of hydrocarbon is at most 36.0%, while a yield of propane and butane is about 26%. In another case, a yield of hydrocarbon is 35.7%, while a yield of propane and butane is about 27%.

Furthermore, a product obtained by the process described in the above-mentioned Japanese Patent Laid-open Publication No. 61-23688, may not have a sufficiently low carbon dioxide content. When a yield of hydrocarbon is at its highest, that is 36.0%, a yield of carbon dioxide is 33.9%. When a yield of hydrocarbon is 35.7%, a yield of carbon dioxide is 30.7%. Carbon dioxide is less useful and is hard to be reused, and therefore, it is economically undesirable to yield a large amount of carbon dioxide as a by-product.

And, the above-mentioned Japanese Patent Laid-open Publication No. 61-23688 describes that, from the results in Examples 1 to 8 therein, a reaction temperature is preferably about 270 to 370° C. and a pressure is preferably about 10 to 50 atm (about 1.0 to 5.1 MPa) in a process for producing a lower paraffin using the mixed catalyst. However, when an LPG production reaction is carried out under a reaction pressure of 10 atm (about 1.0 MPa), an activity (a conversion of carbon monoxide) and a yield of hydrocarbon are further lower, and a proportion of propane (C3) and butane (C4) in the hydrocarbon produced is lower, in comparison with the result when an LPG production reaction is carried out under a reaction pressure of 20 atm (about 2.0 MPa) or higher. When a synthesis gas consisting of hydrogen and carbon monoxide is reacted to produce LPG, it may be necessary to carry out the reaction under relatively severe conditions with a high reaction pressure.

As a process for producing LPG, "Selective Synthesis of LPG from Synthesis Gas", Kaoru Fujimoto et al., Bull. Chem. Soc. Jpn., 58, p. 3059-3060 (1985) discloses that, using a hybrid catalyst consisting of a methanol synthesis catalyst such as a 4 wt % Pd/$SiO_2$, a Cu—Zn—Al mixed oxide {Cu:Zn:Al=40:23:37 (atomic ratio)} or a Cu-based low-pressure methanol synthesis catalyst (Trade name: BASF S3-85) and a high-silica Y-type zeolite with $SiO_2/Al_2O_3$=7.6 treated with steam at 450° C. for 1 hour, C2 to C4 paraffins can be produced in a selectivity of 69 to 85% via methanol and dimethyl ether from a synthesis gas. However, as is in the process described in the above-mentioned Japanese Patent Laid-open Publication No. 61-23688, the process described in the reference does not always give a sufficiently high activity (a conversion of carbon monoxide) and a sufficiently high yield of a hydrocarbon, and the product may not have a sufficiently low carbon dioxide content. Moreover, in the process described in the reference, the LPG production reactions were carried out under relatively severe conditions with a reaction temperature of 270 to 320° C. and a reaction pressure of 20 kg/$cm^2$ (about 2.0 MPa).

On the other hand, "Methanol/Dimethyl Ether Conversion on Zeolite Catalysts for Indirect Synthesis of LPG from Natural Gas", Yingjie Jin et al., Dai 92 Kai Shokubai Touronkai TouronkaiA Yokousyuu, (the summaries of the 92th Catalysis Society of Japan (CatSJ) Meeting, Meeting-A), p. 322, Sep. 18, 2003 discloses a process for producing LPG, using at least one selected from the group consisting of methanol and dimethyl ether as a starting material. Specifically, a starting gas, whose composition is methanol:$H_2$:$N_2$=1:1:1, was passed through the two-layered catalyst layer consisting of ZSM-5 as the former layer and Pt—C as the latter layer (ZSM-5/Pt—C Series) or a mixed catalyst layer consisting of ZSM-5 and Pt—C (ZSM-5/Pt—C Pellet-mixture), under a slightly increased pressure, at a reaction temperature of 603 K. (330° C.) and at a methanol-based LHSV of 20 $h^{-1}$, to carry out an LPG production reaction.

However, the process described in the above-mentioned "Methanol/Dimethyl Ether Conversion on Zeolite Catalysts for Indirect Synthesis of LPG from Natural Gas", Dai 92 Kai Shokubai Touronkai TouronkaiA Yokousyuu, (the summaries of the 92th Catalysis Society of Japan (CatSJ) Meeting, Meeting-A), p. 322 may not give a sufficiently high conversion of methanol to propane and butane. When using a ZSM-5/Pt—C Series as a catalyst layer, a conversion of methanol to a hydrocarbon is 64.0% on the basis of carbon, while a conversion of methanol to propane and butane is about 38.7% on the basis of carbon. When using a ZSM-5/Pt—C Pellet-mixture as a catalyst layer, the result is even worse; specifically, a conversion of methanol to a hydrocarbon is 20.6% on the basis of carbon, while a conversion of methanol to propane and butane is about 10.8% on the basis of carbon.

Furthermore, when using a ZSM-5/Pt—C Series as a catalyst layer, the deterioration with time of the catalyst may be generally significant and the catalyst life may not be sufficiently long. Generally, when an olefin is produced from methanol and/or dimethyl ether using a zeolite as a catalyst, the zeolite catalyst is apt to be deteriorated due to coking.

SUMMARY OF THE INVENTION

An objective of this invention is to provide a process for economically producing a hydrocarbon containing propane or butane as a main component, i.e., a liquefied petroleum gas (LPG) with a high yield, from at least one selected from the group consisting of methanol and dimethyl ether.

The present invention provides a process for producing a liquefied petroleum gas, comprising the step of:

reacting at least one selected from the group consisting of methanol and dimethyl ether with hydrogen in the presence of a catalyst for producing a liquefied petroleum gas, to produce a liquefied petroleum gas containing propane or butane as a main component.

Moreover, the present invention provides the above process for producing a liquefied petroleum gas, wherein a conversion of methanol and/or dimethyl ether to propane and butane is 40% or higher on the basis of carbon.

Moreover, the present invention provides the above process for producing a liquefied petroleum gas, wherein the catalyst for producing a liquefied petroleum gas is a catalyst in which an olefin-hydrogenation catalyst component is supported on a zeolite.

Herein, an "olefin-hydrogenation catalyst component" means a compound which can act as a catalyst in a hydrogenation reaction of an olefin into a paraffin.

Herein, a zeolite is those which can act as a catalyst in a condensation reaction of methanol into a hydrocarbon and/or a condensation reaction of dimethyl ether into a hydrocarbon.

Moreover, the present invention provides the above process for producing a liquefied petroleum gas, wherein the total amount of the supported olefin-hydrogenation catalyst component in the catalyst for producing a liquefied petroleum gas is 0.005 to 5% by weight.

Moreover, the present invention provides a process for producing a liquefied petroleum gas, comprising the steps of:

(1) feeding a synthesis gas to a catalyst layer comprising a methanol synthesis catalyst, to produce a reactant gas containing methanol and hydrogen (Methanol production step); and (2) feeding the reactant gas produced in the methanol production step to a catalyst layer comprising a catalyst for producing a liquefied petroleum gas, to produce a liquefied petroleum gas containing propane or butane as a main component (Liquefied petroleum gas production step).

Moreover, the present invention provides a process for producing a liquefied petroleum gas, comprising the steps of:

(1) feeding a synthesis gas to a catalyst layer comprising a methanol synthesis catalyst and a methanol dehydration catalyst, to produce a reactant gas containing dimethyl ether and hydrogen (Dimethyl ether production step); and (2) feeding the reactant gas produced in the dimethyl ether production step to a catalyst layer comprising a catalyst for producing a liquefied petroleum gas, to produce a liquefied petroleum gas containing propane or butane as a main component (Liquefied petroleum gas production step).

Moreover, the present invention provides a process for producing a liquefied petroleum gas, comprising the steps of:

(1) producing a synthesis gas from a carbon-containing starting material and at least one selected from the group consisting of $H_2O$, $O_2$ and $CO_2$ (Synthesis gas production step);

(2) feeding the synthesis gas to a catalyst layer comprising a methanol synthesis catalyst, to produce a reactant gas containing methanol and hydrogen (Methanol production step); and (3) feeding the reactant gas produced in the methanol production step to a catalyst layer comprising a catalyst for producing a liquefied petroleum gas, to produce a liquefied petroleum gas containing propane or butane as a main component (Liquefied petroleum gas production step).

Moreover, the present invention provides a process for producing a liquefied petroleum gas, comprising the steps of:

(1) producing a synthesis gas from a carbon-containing starting material and at least one selected from the group consisting of $H_2O$, $O_2$ and $CO_2$ (Synthesis gas production step);

(2) feeding the synthesis gas to a catalyst layer comprising a methanol synthesis catalyst and a methanol dehydration catalyst, to produce a reactant gas containing dimethyl ether and hydrogen (Dimethyl ether production step); and (3) feeding the reactant gas produced in the dimethyl ether production step to a catalyst layer comprising a catalyst for producing a liquefied petroleum gas, to produce a liquefied petroleum gas containing propane or butane as a main component (Liquefied petroleum gas production step).

Herein, "synthesis gas" means a mixed gas comprising hydrogen and carbon monoxide, and is not limited to a mixed gas consisting of hydrogen and carbon monoxide. A synthesis gas may be, for example, a mixed gas comprising carbon dioxide, water, methane, ethane, ethylene and so on. A synthesis gas produced by reforming a natural gas generally contains, in addition to hydrogen and carbon monoxide, carbon dioxide and water vapor. A synthesis gas may be a coal gas produced by coal gasification or a water gas produced from a coal coke.

In this invention, at least one selected from the group consisting of methanol and dimethyl ether is reacted with hydrogen in the presence of a catalyst for producing a liquefied petroleum gas, to produce a hydrocarbon containing propane or butane as a main component, i.e., a liquefied petroleum gas (LPG). A catalyst for producing a liquefied petroleum gas used in this invention is preferably an olefin-hydrogenation catalyst component supported zeolite (a catalyst in which an olefin-hydrogenation catalyst component is supported on a zeolite), more preferably a 0.005 to 5 wt % olefin-hydrogenation catalyst component supported zeolite. Among others, a preferable catalyst for producing a liquefied petroleum gas used in this invention is Pd and/or Pt supported ZSM-5, and particularly preferable is 0.005 to 5 wt % Pd and/or Pt supported ZSM-5.

According to this invention, LPG can be produced with a conversion of methanol and/or dimethyl ether to propane and butane of 40% or higher, specifically 45% or higher, more specifically 50% or higher on the basis of carbon.

In this invention, LPG containing propane or butane as a main component may be produced from at least one selected from the group consisting of methanol and dimethyl ether, and hydrogen, following the formula (I) shown below.

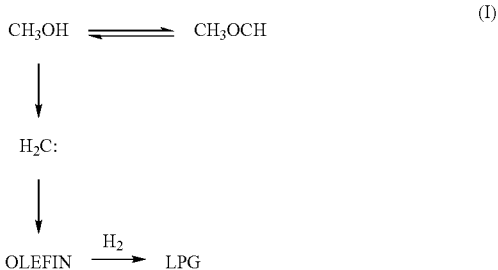

In a process of this invention, methanol is dehydrated to generate a carbene (H₂C:) by a concerted catalysis of an acidic site and a basic site, which are at a spatial field inside a pore in a zeolite catalyst component. And then, the carbene is polymerized to form an olefin containing propylene or butene as a main component. More specifically, it may be thought that ethylene is formed as a dimer; propylene is formed as a trimer or a reaction product with ethylene; and butylene is formed as a tetramer, a reaction product with propylene or a product of dimerization of ethylene.

In the olefin formation process, there would occur other reactions such as formation of dimethyl ether by dehydration-dimerization of methanol and formation of methanol by hydration of dimethyl ether.

And then, the formed olefin is hydrogenated by the catalysis of an olefin-hydrogenation catalyst component, to form a paraffin containing propane or butane as a main component, i.e., LPG.

According to this invention, a hydrocarbon containing propane or butane as a main component, i.e., LPG, can be produced in a higher yield, in comparison with a conventional process for producing LPG by reacting carbon monoxide and hydrogen.

Furthermore, according to this invention, LPG can be produced under a lower pressure than a process for producing LPG by reacting carbon monoxide and hydrogen. Specifically, a LPG production reaction from at least one selected from the group consisting of methanol and dimethyl ether, and hydrogen (a conversion reaction of methanol and/or dimethyl ether) can be carried out under a pressure of lower than 2 MPa, particularly 1.5 MPa or lower, more particularly lower than 1 MPa, further particularly 0.6 MPa or lower. In addition, the conversion reaction of methanol and/or dimethyl ether may proceed to substantially 100% under such a low pressure.

According to this invention, the production amount of carbon monoxide and carbon dioxide as by-products can be significantly reduced by selecting an appropriate material as a catalyst for producing a liquefied petroleum gas, for example, by using 0.005 to 5 wt % Pd and/or Pt supported ZSM-5 as a catalyst for producing a liquefied petroleum gas. Specifically, a conversion of methanol and/or dimethyl ether to carbon monoxide and carbon dioxide can be reduced to 10% or less, particularly 5% or less, more particularly 2% or less, further particularly 1% or less on the basis of carbon.

In the process, a product generally includes, in addition to propane and butane that are main components, other hydrocarbons such as ethane, methane, pentane and hexane. These hydrocarbons other than propane and butane are by-products in an LPG production reaction, but they are more useful than carbon monoxide and carbon dioxide. The hydrocarbons other than propane and butane can be used as, for example, a calorie adjustor for town gas, a chemical raw material, a gasoline fuel and so on. Moreover, methanol, which is used as a starting material in this invention, is industrially produced on a large scale using a synthesis gas as a starting material, and the hydrocarbons other than propane and butane can be used as a starting material for producing the synthesis gas.

The reason is not clear why the production amount of carbon monoxide and carbon dioxide as by-products can be significantly reduced by using 0.005 to 5 wt % Pd and/or Pt supported ZSM-5, or the like as a catalyst for producing a liquefied petroleum gas. It may be, however, considered that decomposition of methanol to CO and $CO_2$ is inhibited, because the number of noble metal (e.g., Pd, Pt and so on) surfaces, which are active sites for decomposition of methanol, is significantly less than the number of acidic sites in a zeolite, which are active sites for dehydration of methanol and olefin formation.

On the other hand, a process wherein an olefin containing propylene or butene as a main component is produced from at least one selected from the group consisting of methanol and dimethyl ether using a zeolite catalyst; and then the olefin produced is hydrogenated using an olefin-hydrogenation catalyst to form a paraffin containing propane or butane as a main component, i.e., LPG may be also considered as a process for producing LPG.

The above process is, however, conducted in two steps; the step of carrying out the reaction for producing the olefin from methanol and/or dimethyl ether and the step of carrying out the hydrogenation reaction of the olefin into the paraffin. A process for producing LPG according to this invention, where LPG is produced in one step from methanol and/or dimethyl ether, comprises reduced number of steps and is economically superior in economical efficiency, in comparison with the above process.

In the above process for producing LPG comprising two reaction steps, a zeolite catalyst is apt to be deteriorated due to coking in the step of producing an olefin from methanol and/or dimethyl ether. The catalyst, therefore, may not have a sufficiently long catalyst life. In contrast, according to the process for producing LPG comprising one reaction step of this invention, even when using a zeolite-containing catalyst, deterioration of a zeolite due to coking can be prevented and thus LPG can be stably produced for a long period with reducing a catalyst cost.

Furthermore, in the above process for producing LPG comprising two reaction steps, a gas containing carbon monoxide and/or carbon dioxide is not preferable as a starting gas (a gas fed into a reactor). When a starting gas contains carbon monoxide and/or carbon dioxide, in the second step of olefin hydrogenation, carbon monoxide and carbon dioxide may act as a catalyst poisoning component, and the formation of methane by hydrogenation may occur. In contrast, in the process for producing LPG according to this invention, the presence of carbon monoxide and/or carbon dioxide in a starting gas has no effect on LPG production.

Methanol, which is a reaction raw material, is industrially produced on a large scale using a synthesis gas as a starting material, and the product of the methanol synthesis reaction generally contains carbon monoxide, which is an unreacted starting material, and carbon dioxide, which is a by-product. Dimethyl ether can be produced from a synthesis gas, and the product of the dimethyl ether synthesis reaction also generally contains carbon monoxide and/or carbon dioxide. When constructing a process for producing LPG which comprises the step of producing methanol and/or dimethyl ether from a synthesis gas and the following step of producing LPG from methanol and/or dimethyl ether, employing the above process for producing LPG comprising two reaction steps results in a cumbersome and complicated procedure with many steps, because it is necessary to purify a product after methanol and/or dimethyl ether synthesis reaction. In contrast, employing the process for producing LPG of this invention, which comprises one reaction step, may be economically advantageous, because it is not necessary to purify a product after methanol and/or dimethyl ether synthesis reaction, and thus the product can be used as a starting material for producing LPG without treatment.

As described above, according to this invention, a hydrocarbon containing propane or butane as a main component, i.e., a liquefied petroleum gas (LPG) can be economically produced with a relatively higher yield using at least one selected from the group consisting of methanol and dimethyl ether or a synthesis gas as a starting material.

According to this invention, for example, a hydrocarbon with the total content of propane and butane of 40% or more, specifically 45% or more, more specifically 50% or more (including 100%) on the basis of carbon can be produced with high activity and high selectivity, specifically a conversion of methanol and/or dimethyl ether to a hydrocarbon of 90% or more, more specifically 95% or more, more particularly specifically 98% or more.

Furthermore, according to this invention, LPG with the total content of propane and butane of 90% or more, specifically 95% or more (including 100%) on the basis of carbon, for example, can be produced. And, according to this invention, LPG with a content of propane of 50% or more, specifically 60% or more, more specifically 65% or more (including 100%) on the basis of carbon, for example, can be produced.

DESCRIPTION OF THE MAIN SYMBOLS

Figure 1:
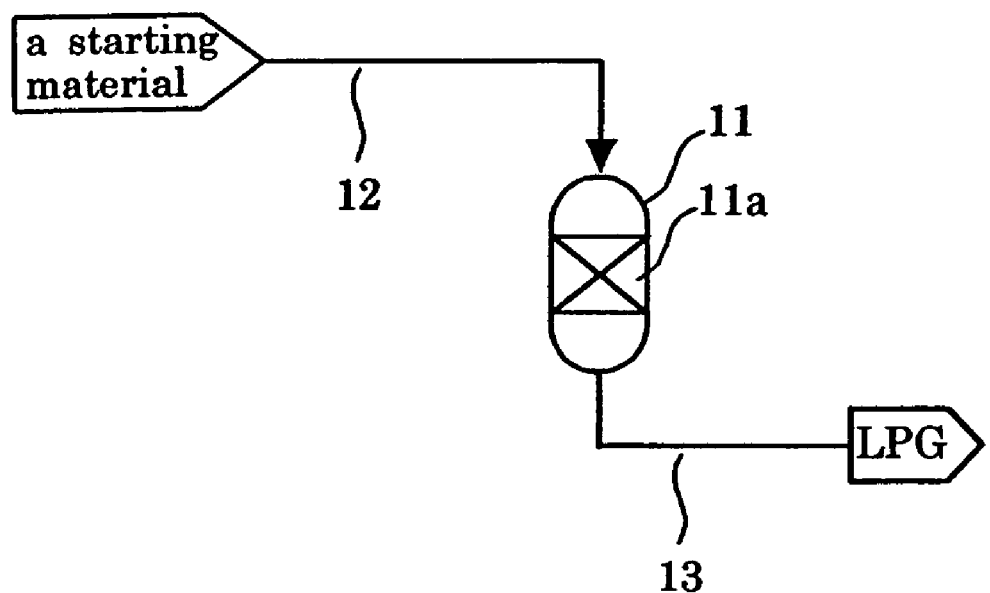
FIG. 1 is a process flow diagram showing a main configuration in an example of an LPG producing apparatus suitable for conducting the process for LPG production according to this invention.

11: a reactor
11a: a catalyst layer containing a catalyst for producing a liquefied petroleum gas
12, 13: lines.

DETAILED DESCRIPTION OF THE EMBODIMENTS

1. Catalyst for Producing a Liquefied Petroleum Gas

Examples of a catalyst for producing a liquefied petroleum gas used in this invention include a catalyst in which an olefin-hydrogenation catalyst component is supported on a zeolite; a catalyst comprising a Cu—Zn-based methanol synthesis catalyst and a USY-type zeolite in a ratio of the Cu—Zn-based methanol synthesis catalyst: the USY-type zeolite=1:5 to 2:1 (by weight); a catalyst comprising a Cu—Zn-based methanol synthesis catalyst and β-zeolite in a ratio of the Cu—Zn-based methanol synthesis catalyst: the β-zeolite=1:5 to 2:1 (by weight); a catalyst comprising a Pd-based methanol synthesis catalyst and a β-zeolite in a ratio of the Pd-based methanol synthesis catalyst: the β-zeolite=1:5 to 2.5:1 (by weight); a catalyst comprising a hydrogenation catalyst such as supported Fe, Co and Ni, and a USY-type zeolite; and a catalyst comprising a hydrogenation catalyst such as supported Fe, Co and Ni, and a β-zeolite. In the above catalyst comprising a methanol synthesis catalyst and a zeolite, the methanol synthesis catalyst acts as an olefin-hydrogenation catalyst component.

For the above catalyst, any of Cu—Zn-based methanol synthesis catalysts known in the art can be used, and a commercially available Cu—Zn-based methanol synthesis catalyst can be used. Meanwhile, examples of a Pd-based methanol synthesis catalyst include a catalyst in which 0.1 to 10 wt % Pd is supported on a support such as silica; and a catalyst in which 0.1 to 10 wt % Pd and 5 wt % or less (excluding 0 wt %) at least one selected from the group consisting of alkali metals, alkaline earth metals and lanthanoid metals such as Ca are supported on a support such as silica.

A catalyst for producing a liquefied petroleum gas of this invention may comprise other additive components as long as its intended effect would not be impaired. For example, any of the above catalysts may be diluted with quartz sand and then used.

In this invention, a particularly preferable catalyst for producing a liquefied petroleum gas is a catalyst in which an olefin-hydrogenation catalyst component is supported on a zeolite.

An olefin-hydrogenation catalyst component may be selected from those which can act as a catalyst in a hydrogenation reaction of an olefin into a paraffin without limitation. Specific examples of an olefin-hydrogenation catalyst component include Fe, Co, Ni, Cu, Zn, Ru, Rh, Pd, Ir, Pt and so on. The olefin-hydrogenation catalyst components may be used alone or in combination of two or more.

Among them, a preferable olefin-hydrogenation catalyst component is Pd or Pt, more preferably Pd. By using Pd and/or Pt as an olefin-hydrogenation catalyst component, the production amount of carbon monoxide and carbon dioxide as by-products can be more sufficiently reduced, while maintaining a high yield of propane and butane.

Pd and Pt may not be necessarily contained as a metal, but can be contained in the form of an oxide, a nitrate, a chloride or the like. In such a case, it is preferred that the catalyst may be subjected to, for example, reduction by hydrogen before the reaction, to convert Pd and/or Pt into metallic palladium and/or metallic platinum, for achieving higher catalytic activity.

The reduction treatment condition for activating Pd and/or Pt can be determined, depending on some factors such as the types of a supported palladium compound and/or a supported platinum compound, as appropriate.

In the light of catalytic activity, an olefin-hydrogenation catalyst component such as Pd and Pt is preferably supported on a zeolite in a highly dispersed manner.

When a catalyst for producing a liquefied petroleum gas is a catalyst in which an olefin-hydrogenation catalyst component is supported on a zeolite, the total amount of the supported olefin-hydrogenation catalyst component in the catalyst is preferably 0.005 wt % or more, more preferably 0.01 wt % or more, particularly preferably 0.05 wt % or more. On the other hand, when a catalyst for producing a liquefied petroleum gas is a catalyst in which an olefin-hydrogenation catalyst component is supported on a zeolite, the total amount of the supported olefin-hydrogenation catalyst component in the catalyst is preferably 5 wt % or less, more preferably 1 wt % or less, particularly preferably 0.7 wt % or less, in the light of dispersibility and economical efficiency. By adjusting the amount of a supported olefin-hydrogenation catalyst component in a catalyst for producing a liquefied petroleum gas within the above range, propane and/or butane can be produced with a higher conversion, a higher selectivity and a higher yield.

By adjusting the amount of a supported olefin-hydrogenation catalyst component to be 0.005 wt % or more, more preferably 0.01 wt % or more, particularly preferably 0.05 wt % or more, methanol and/or dimethyl ether can be converted into a liquefied petroleum gas containing propane or butane as a main component with a higher selectivity. On the other hand, by adjusting the amount of a supported olefin-hydrogenation catalyst component to be 5 wt % or less, more preferably 1 wt % or less, particularly preferably 0.7 wt % or less, a higher catalytic activity can be achieved.

A zeolite, on which an olefin-hydrogenation catalyst component is supported, may be selected from zeolites which can act as a catalyst in a condensation reaction of methanol into a hydrocarbon and/or a condensation reaction of dimethyl ether into a hydrocarbon without limitation, and a commercially available zeolite can be used. Examples of such a zeolite include ZSM-5, β-zeolite and USY-type zeolite. Such zeolites may be used alone or in combination of two or more.

It is important to use a zeolite having a suitable acid strength, a suitable acidity (acid concentration) and a suitable pore size as a zeolite, on which an olefin-hydrogenation catalyst component is supported. A Si/Al ratio (atomic ratio) of a zeolite is also important. Furthermore, other factors such as a pore structure and a crystal size may be also important.

Among others, ZSM-5 is preferable as a zeolite, on which an olefin-hydrogenation catalyst component is supported. By using ZSM-5, a higher catalytic activity and a higher yield of propane and butane can be achieved, and furthermore the production amount of carbon monoxide and carbon dioxide as by-products can be more sufficiently reduced.

A preferable ZSM-5, on which an olefin-hydrogenation catalyst component is supported, is high-silica ZSM-5, more specifically ZSM-5 with a Si/Al ratio (atomic ratio) of 20 to 100. By using ZSM-5 with a Si/Al ratio (atomic ratio) of 20 to 100, a higher catalytic activity and a higher yield of propane and butane can be achieved, and furthermore the production amount of carbon monoxide and carbon dioxide as by-products can be more sufficiently reduced. A Si/Al ratio (atomic ratio) of ZSM-5 is more preferably 70 or less, particularly preferably 60 or less.

A catalyst for producing a liquefied petroleum gas used in this invention is particularly preferably Pd and/or Pt supported ZSM-5, more preferably Pd supported ZSM-5.

In this catalyst for producing a liquefied petroleum gas, the total amount of supported Pd and/or Pt is preferably 0.005 wt % or more, more preferably 0.01 wt % or more, particularly preferably 0.05 wt % or more. And, the total amount of supported Pd and/or Pt is preferably 5 wt % or less, more preferably 1 wt % or less, particularly preferably 0.7 wt % or less.

The above catalyst for producing a liquefied petroleum gas may be a zeolite on which other components, in addition to an olefin-hydrogenation catalyst component, are supported as long as the desired effects of the catalyst are maintained.

A catalyst for producing a liquefied petroleum gas in which an olefin-hydrogenation catalyst component is supported on a zeolite can be prepared by a known method such as an ion exchange method and an impregnation method. Sometimes, in comparison with a catalyst for producing a liquefied petroleum gas prepared by an impregnation method, a catalyst for producing a liquefied petroleum gas prepared by an ion exchange method may exhibit a higher catalytic activity, and thus may allow an LPG production reaction to proceed at a lower reaction temperature, and a higher selectivity for a hydrocarbon and a higher selectivity for propane and butane may be achieved.

A zeolite on which an olefin-hydrogenation catalyst component is supported, may be used, if necessary, after pulverization or molding. A molding method of a catalyst is not particularly limited, but is preferably a dry method including an extrusion and a tablet-compression.

2. Process for Producing a Liquefied Petroleum Gas

Next, there will be described a process for producing a liquefied petroleum gas comprising propane or butane, preferably propane, as a main component by reacting at least one selected from the group consisting of methanol and dimethyl ether with hydrogen using at least one of the catalysts for producing a liquefied petroleum gas as described above.

In the process for producing LPG according to this invention, a reaction raw material may be methanol or dimethyl ether alone, or may be a mixture of methanol and dimethyl ether. When using a mixture of methanol and dimethyl ether as a reaction raw material, a ratio of methanol to dimethyl ether is not particularly limited, and can be appropriately determined.

The reaction can be conducted in a fixed bed, a fluid bed or a moving bed. The reaction conditions such as a composition of a starting gas, a reaction temperature, a reaction pressure and a contact time with a catalyst can be appropriately determined, depending on a kind of a catalyst to be used, and the like. For example, the LPG production reaction may be carried out under the following conditions.

In the light of achieving a higher catalytic activity, a reaction temperature is preferably 300° C. or higher, more preferably 320° C. or higher. In the light of achieving a higher selectivity for a hydrocarbon and a higher selectivity for propane and butane, as well as a long catalyst life, a reaction temperature is preferably 470° C. or lower, more preferably 450° C. or lower, particularly preferably 400° C. or lower.

In the light of achieving a higher activity and good operability of an apparatus, a reaction pressure is preferably 0.1 MPa or higher, more preferably 0.15 MPa or higher. In the light of economical efficiency and safety, a reaction pressure is preferably 3 MPa or lower, more preferably 2.5 MPa or lower, particularly preferably lower than 2 MPa, further preferably 1.5 MPa or lower. Moreover, by controlling a reaction pressure to be 2.5 MPa or lower, more preferably 1.5 MPa or lower, the production amount of carbon monoxide and carbon dioxide as by-products can be more sufficiently reduced.

Furthermore, according to this invention, LPG can be produced under a further lower pressure. Specifically, LPG can be produced from at least one selected from the group consisting of methanol and dimethyl ether, and hydrogen under a pressure of lower than 1 MPa, particularly 0.6 MPa or lower.

A gas space velocity is preferably 1500 $hr^{-1}$ or more, more preferably 1800 $hr^{-1}$ or more, in the light of economical efficiency. In addition, a gas space velocity is preferably 60000 $hr^{-1}$ or less, more preferably 30000 $hr^{-1}$ or less, in the light of achieving a higher activity and a higher selectivity for propane and butane.

When a reaction raw material is methanol, a concentration of methanol in a gas fed into a reactor (also referred to as a "starting gas") is preferably 20 mol % or more, more preferably 30 mol % or more, in the light of productivity and economical efficiency. In the light of reducing a calorific value and a deterioration of a catalyst, a concentration of methanol in a gas fed into a reactor is preferably 60 mol % or less, more preferably 40 mol % or less.

When a reaction raw material is methanol, a concentration of hydrogen in a gas fed into a reactor is preferably 1 mole or more, more preferably 1.2 moles or more per 1 mole of methanol, in the light of improving a hydrogenation rate and reducing deterioration of a catalyst. In the light of productivity and economical efficiency, a concentration of hydrogen in a gas fed into a reactor is preferably 3 moles or less, more preferably 2 moles or less per 1 mole of methanol.

When a reaction raw material is dimethyl ether, a concentration of dimethyl ether in a gas fed into a reactor is preferably 10 mol % or more, more preferably 20 mol % or more, in the light of productivity and economical efficiency. In the light of reducing a calorific value and a deterioration of a catalyst, a concentration of dimethyl ether in a gas fed into a reactor is preferably 40 mol % or less, more preferably 30 mol % or less.

When a reaction raw material is dimethyl ether, a concentration of hydrogen in a gas fed into a reactor is preferably 2 mole or more, more preferably 2.5 moles or more per 1 mole of dimethyl ether, in the light of improving a hydrogenation rate and reducing deterioration of a catalyst. In the light of productivity and economical efficiency, a concentration of hydrogen in a gas fed into a reactor is preferably 5 moles or less, more preferably 4 moles or less per 1 mole of dimethyl ether.

When a reaction raw material is a mixture of methanol and dimethyl ether, concentrations of methanol, dimethyl ether and hydrogen in a gas fed into a reactor are preferably within the same range as the above preferable range when a reaction raw material is methanol and the above preferable range when a reaction raw material is dimethyl ether. And, these preferable ranges can be calculated based on a ratio of methanol to dimethyl ether.

A gas fed into a reactor may contain water, an inert gas and the like, in addition to at least one selected from the group consisting of methanol and dimethyl ether, which are reaction raw materials, and hydrogen. The gas fed into a reactor may contain carbon monoxide and/or carbon dioxide.

At least one selected from the group consisting of methanol and dimethyl ether, and hydrogen may be mixed, and then fed to a reactor or, alternatively, these may be fed to a reactor separately.

A gas fed into a reactor can be dividedly fed to the reactor so as to control a reaction temperature.

The reaction can be conducted in a fixed bed, a fluid bed, a moving bed or the like, and can be preferably selected, taking both of control of a reaction temperature and a regeneration method of the catalyst into account. For example, a fixed bed may include a quench type reactor such as an internal multistage quench type, a multitubular type reactor, a multistage type reactor having a plurality of internal heat exchangers or the like, a multistage cooling radial flow type, a double pipe heat exchange type, an internal cooling coil type, a mixed flow type, and other types of reactors.

When used, a catalyst for producing a liquefied petroleum gas can be diluted with silica, alumina or an inert and stable heat conductor for controlling a temperature. In addition, when used, a catalyst for producing a liquefied petroleum gas can be applied to the surface of a heat exchanger for controlling a temperature.

According to the present invention, an LPG production reaction can be carried out with a conversion of methanol and/or dimethyl ether of 99% or more, particularly about 100%. Furthermore, according to the present invention, an LPG production reaction can be carried out with such a high activity and selectivity that a conversion of methanol and/or dimethyl ether to a hydrocarbon is 90% or more, particularly 95% or more, more particularly 98% or more.

A reaction product gas thus produced (a lower-paraffin-containing gas) comprises a hydrocarbon containing propane or butane as a main component. In the light of liquefaction properties, it is preferable that the total content of propane and butane is higher in a lower-paraffin-containing gas. According to this invention, there can be obtained a lower-paraffin-containing gas having a content of propane and butane of 40% or more, preferably 45% or more, more preferably 50% or more (including 100%) on the basis of carbon to the hydrocarbon contained therein, in total.

Furthermore, a lower-paraffin-containing gas produced preferably contains more propane in comparison with butane, in the light of inflammability and vapor pressure properties.

A lower-paraffin-containing gas produced generally comprises water; a low-boiling component having a lower boiling point or a lower sublimation point than the boiling point of propane; and a high-boiling component having a higher boiling point than the boiling point of butane. Examples of a low-boiling component include hydrogen, which is an unreacted starting material; and ethane, methane, carbon monoxide and carbon dioxide, which are by-products. Examples of a high-boiling component include high-boiling paraffins (e.g., pentane, hexane and so on), which are by-products.

Thus, water, a low-boiling component and a high-boiling component are, as necessary, separated from a lower-paraffin-containing gas produced, so as to obtain a liquefied petroleum gas (LPG) comprising propane or butane as a main component. If necessary, methanol and/or dimethyl ether, which are unreacted starting materials, are also separated from a lower-paraffin-containing gas by a known method.

Separation of water, a low-boiling component or a high-boiling component can be conducted in accordance with a known method.

Water can be separated by, for example, liquid-liquid separation.

A low-boiling component can be separated by, for example, gas-liquid separation, absorption separation or distillation; more specifically, gas-liquid separation at an ambient temperature under increased pressure, absorption separation at an ambient temperature under increased pressure, gas-liquid separation with cooling, absorption separation with cooling, or combination thereof. Alternatively, for this purpose, membrane separation or adsorption separation can be conducted, or these in combination with gas-liquid separation, absorption separation or distillation can be conducted. A gas recovery process commonly employed in an oil factory (described in "Oil Refining Processes", ed. The Japan Petroleum Institute, Kodansha Scientific, 1998, pp. 28-32) can be applied to separation of a low-boiling component.

A preferable method of separation of a low-boiling component is an absorption process where a liquefied petroleum gas comprising propane or butane as a main component is absorbed into an absorbent liquid such as a high-boiling paraffin gas having a higher boiling point than butane, and a gasoline.

A high-boiling component can be separated by, for example, gas-liquid separation, absorption separation or distillation.

The separation conditions may be determined as appropriate in accordance with a known method.

If necessary, the gas may be pressurized and/or cooled so as to obtain a liquefied petroleum gas.

For consumer use, it is preferable that a content of a low-boiling component in the LPG is reduced to 5 mol % or less (including 0 mol %) by separation, for example, in the light of safety in use.

The total content of propane and butane in the LPG thus produced may be 90% or more, more preferably 95% or more (including 100%) on the basis of carbon. And a content of propane in the LPG produced may be 50% or more, more preferably 60% or more, particularly preferably 65% or more (including 100%) on the basis of carbon. Thus, according to this invention, LPG having a composition suitable for a propane gas, which is widely used as a fuel for household and business use, can be produced.

Next, there will be described an embodiment of a process for producing LPG according to this invention with reference to the drawing.

FIG. 1 shows an embodiment of an LPG production apparatus suitable for carrying out a production process for LPG according to this invention.

First, methanol and/or dimethyl ether, which are reaction raw materials, and hydrogen are fed into a reactor 11 via a line 12. In the reactor 11, there is a catalyst layer 11a comprising a catalyst for producing a liquefied petroleum gas. In the reactor 11, a hydrocarbon gas containing propane or butane as a main component (a lower-paraffin-containing gas) is produced from methanol and/or dimethyl ether and hydrogen in the presence of the catalyst for producing a liquefied petroleum gas.

The hydrocarbon gas thus produced is pressurized and cooled, after optional removal of water or the like, and LPG, which is a product, is obtained from a line 13. Optionally, hydrogen and the like may be removed from the LPG by, for example, gas-liquid separation.

The LPG production apparatus may be, as necessary, provided with a booster, a heat exchanger, a valve, an instrumentation controller and so on, which are not shown.

Thus, LPG is produced from at least one selected from the group consisting of methanol and dimethyl ether, in this invention.

3. Process for Producing a Liquefied Petroleum Gas from a Carbon-containing Starting Material At present, methanol and dimethyl ether, which are used as a starting material in this invention, are produced in an industrial scale.

Methanol is produced, for example, as follows.

First, a synthesis gas is produced by reacting a natural gas (methane) with at least one selected from the group consisting of $H_2O$, $O_2$ and $CO_2$ in the presence of a reforming catalyst such as an Ni-based catalyst, if necessary, after removing a catalyst poisoning component such as sulfur and a sulfur compound from a natural gas (methane) (devulcanization and the like). A water-vapor reforming method, a complex reforming method and an autothermal reforming method of a natural gas (methane) are well known as a process for producing a synthesis gas.

And, a synthesis gas may be also produced by reacting a carbon-containing starting material other than a natural gas with at least one selected from the group consisting of $H_2O$, $O_2$ and $CO_2$ in accordance with a known method. A carbon-containing substance which can react with at least one selected from the group consisting of $H_2O$, $O_2$ and $CO_2$ to form $H_2$ and CO, can be used as a carbon-containing starting material. For example, a lower hydrocarbon such as ethane, a naphtha, a coal, and the like can be used.

Next, methanol is produced from the synthesis gas by reacting carbon monoxide with hydrogen in the presence of a methanol synthesis catalyst. When using a Cu—Zn-based catalyst (a composite oxide containing Cu and Zn) such as a Cu—Zn—Al composite oxide and a Cu—Zn—Cr composite oxide as a methanol synthesis catalyst, the reaction is generally carried out at a reaction temperature of about 230 to 300° C. and under a reaction pressure of about 2 to 10 MPa. When using a Zn—Cr-based catalyst (a composite oxide containing Zn and Cr) as a methanol synthesis catalyst, the reaction is generally carried out at a reaction temperature of about 250 to 400° C. and under a reaction pressure of about 10 to 60 MPa.

A product thus produced (crude methanol) generally comprises water; carbon monoxide, which is an unreacted starting material; carbon dioxide and dimethyl ether, which are by-products; and the like. In this invention, the crude methanol can be used as a starting material.

Dimethyl ether is produced by, for example, dehydration reaction of methanol using a solid acid catalyst such as aluminum phosphate.

A process for producing dimethyl ether from a synthesis gas directly, not via methanol, is being put to practical use. In the process, dimethyl ether can be produced by reacting carbon monoxide with hydrogen at a reaction temperature of about 230 to 280° C. and under a reaction pressure of about 3 to 7 MPa in the presence of a mixed catalyst of a methanol synthesis catalyst and a methanol dehydration catalyst, for example, a mixed catalyst comprising a methanol synthesis catalyst and a methanol dehydration catalyst in a ratio of the methanol synthesis catalyst the methanol dehydration catalyst=1:2 to 2:1 (by weight), using a slurry phase reactor.

A product thus produced (crude dimethyl ether) generally comprises water; carbon monoxide, which is an unreacted starting material; carbon dioxide and methanol, which are by-products; and the like. In this invention, the crude dimethyl ether can be used as a starting material.

According to this invention, a liquefied petroleum gas can be produced by producing a synthesis gas from a carbon-containing starting material and at least one selected from the group consisting of $H_2O$, $O_2$ and $CO_2$ (synthesis gas production step); feeding the obtained synthesis gas to a catalyst layer comprising a methanol synthesis catalyst, to produce a reactant gas containing methanol and hydrogen (methanol production step); and feeding the reactant gas produced in the methanol production step to a catalyst layer comprising a catalyst for producing a liquefied petroleum gas, to produce a liquefied petroleum gas containing propane or butane as a main component in accordance with the above process (liquefied petroleum gas production step).

Moreover, according to this invention, a liquefied petroleum gas can be produced by producing a synthesis gas from a carbon-containing starting material and at least one selected from the group consisting of $H_2O$, $O_2$ and $CO_2$ (synthesis gas production step); feeding the obtained synthesis gas to a catalyst layer comprising a methanol synthesis catalyst and a methanol dehydration catalyst, to produce a reactant gas containing dimethyl ether and hydrogen (dimethyl ether production step); and feeding the reactant gas produced in the dimethyl ether production step to a catalyst layer comprising a catalyst for producing a liquefied petroleum gas, to produce a liquefied petroleum gas containing propane or butane as a main component in accordance with the above process (liquefied petroleum gas production step).

A synthesis gas can be produced in accordance with a known method including the method described above. Methanol and dimethyl ether can be also produced in accordance with a known method including the method described above.

In the above process for producing LPG, a shift reactor may be placed downstream of a reformer, which is a reactor for producing a synthesis gas, so that a synthesis gas composition can be adjusted by a shift reaction ($CO+H_2O \rightarrow CO_2+H_2$).

In the above process for producing LPG, a gas fed into a reactor in the methanol production step or the dimethyl ether production step may be a gas obtained by adding carbon monoxide, hydrogen or other components, if necessary, to the synthesis gas produced in the synthesis gas production step. And a gas fed into a reactor in the methanol production step or the dimethyl ether production step may be a gas obtained by separating a certain component from the synthesis gas produced in the synthesis gas production step.

In the above process for producing LPG, a gas fed into a reactor in the liquefied petroleum gas production step may be a gas obtained by adding methanol and/or dimethyl ether, hydrogen or other components, if necessary, to the reactant gas produced in the methanol production step or the dimethyl ether production step. And a gas fed into a reactor in the liquefied petroleum gas production step may be a gas obtained by separating a certain component from the reactant gas produced in the methanol production step or the dimethyl ether production step.

In the above process for producing LPG, a low-boiling component separated from the lower-paraffin-containing gas in the liquefied petroleum gas production step can be recycled as a starting material for the synthesis gas production step.

The whole low-boiling components separated from the lower-paraffin-containing gas can be recycled to the synthesis gas production step. Alternatively, part of the low-boiling components may be removed outside the system, while the rest of low-boiling components may be recycled to the synthesis gas production step. Low-boiling components can be recycled to the synthesis gas production step after separating only desired components.

In this case, in the synthesis gas production step, a content of a low-boiling component in a gas fed into a reformer, which is a reactor; in other words, a content of a recycled material may be determined as appropriate.

For the purpose of recycling a low-boiling component, a known technique, e.g., appropriately providing a recycle line with a pressurization means can be employed.

According to this invention, a liquefied petroleum gas can be produced from a synthesis gas or a carbon-containing starting material such as a natural gas by utilizing an existing methanol production plant or an existing dimethyl ether production plant, and establishing an LPG production apparatus of this invention therewith.

EXAMPLES

The following will describe the present invention in more detail with reference to Examples. However, the present invention is not limited to these Examples.

Example 1

Preparation of a Catalyst

A mechanically pulverized proton-type ZSM-5 with a Si/Al ratio (atomic ratio) of 20, produced by Tosoh Corporation, was used as a zeolite for a support of an olefin-hydrogenation catalyst component. And, 0.5 wt % of Pd was supported on the ZSM-5 by an ion exchange method as follows.

First, 0.0825 g of palladium chloride (purity:>99 wt %) was dissolved in 10 mL of a 12.5 wt % aqueous ammonia solution at 40 to 50° C. And then, 150 mL of ion-exchanged water was added to the resulting solution to obtain a Pd-containing solution. 10 g of ZSM-5 zeolite was added to the obtained Pd-containing solution, and the mixture was heated and stirred at 60 to 70° C. for 6 hours. After the ion-exchange process, the resulting material was repeatedly filtrated and washed with ion-exchanged water until no chloride ions were observed in a filtrate.

Then, the Pd ion-exchanged ZSM-5 was dried at 120° C. for 12 hours, and calcined at 500° C. in an air for 2 hours. Subsequently, it was mechanically pulverized, and then molded by a tablet-compression and sized to give a granular catalyst for producing a liquefied petroleum gas (Pd-ZSM-5) having an average particle size of 1 mm.

Production of LPG

In a tubular reactor with an inner diameter of 6 mm was placed 1 g of the catalyst prepared as above, and the catalyst was reduced under a hydrogen stream at 400° C. for 3 hours before the beginning of the reaction.

After reduction treatment of the catalyst, a starting gas consisting of 75 mol % of hydrogen and 25 mol % of dimethyl ether ($H_2$/DME=3 (molar ratio)) was passed through the catalyst layer at a reaction temperature of 350° C., a reaction pressure of 2.1 MPa and a gas space velocity of 2000 $hr^{-1}$ (W/F=9.0 g·h/mol) to carry out the LPG production reaction. Gas chromatographic analysis of the product indicated that, after three hours from the beginning of the reaction, a conversion of dimethyl ether was 100%, a conversion of dimethyl ether to carbon monoxide was 1.4%, a conversion of dimethyl ether to carbon dioxide was 0.4%, and a conversion of dimethyl ether to a hydrocarbon was 98.2%. The produced hydrocarbon gas contained propane and butane in 50.6% on the basis of carbon, which consisted of 65.9% of propane and 34.1% of butane on the basis of carbon. A conversion of dimethyl ether to propane and butane was 49.7% on the basis of carbon.

The results are shown in Table 1.

Example 2

Preparation of a Catalyst

A catalyst for producing a liquefied petroleum gas, 0.5 wt % Pt supported ZSM-5 (Pt-ZSM-5) was prepared in the same way as Example 1, except that a 4.6 wt % solution of $Pt(NH_3)_2(NO_3)_2$ was used instead of an ammonia solution of palladium chloride.

Production of LPG

Using the prepared catalyst, the LPG production reaction was carried out in the same way as Example 1. Gas chromatographic analysis of the product indicated that, after three hours from the beginning of the reaction, a conversion of dimethyl ether was 100%, a conversion of dimethyl ether to carbon monoxide was 3.0%, a conversion of dimethyl ether to carbon dioxide was 2.4%, and a conversion of dimethyl ether to a hydrocarbon was 94.5%. The produced hydrocarbon gas contained propane and butane in 54.7% on the basis of carbon, which consisted of 74.2% of propane and 25.8% of butane on the basis of carbon. A conversion of dimethyl ether to propane and butane was 51.7% on the basis of carbon.

The results are shown in Table 1.

Example 3

Preparation of a Catalyst

A mechanically pulverized proton-type ZSM-5 with a Si/Al ratio (atomic ratio) of 20, produced by Tosoh Corporation, was used as a zeolite for a support of an olefin-hydrogenation catalyst component, as was in Example 1. And, 0.5 wt % of Pd was supported on the ZSM-5 by an impregnation method as follows.

First, 0.0825 g of palladium chloride (purity:>99 wt %) was dissolved in 10 mL of a 12.5 wt % aqueous ammonia solution at 40 to 50° C. And then, 150 mL of ion-exchanged water was added to the resulting solution to obtain a Pd-containing solution. 10 g of ZSM-5 zeolite was added to the obtained Pd-containing solution, and the mixture was stirred at room temperature for 6 hours to impregnate ZSM-5 with the Pd-containing solution.

Then, the ZSM-5 impregnated with the Pd-containing solution was dried at 120° C. for 12 hours, and calcined at 500° C. in an air for 2 hours. Subsequently, it was mechanically pulverized, and then molded by a tablet-compression and sized to give a granular catalyst for producing a liquefied petroleum gas (Pd/ZSM-5) having an average particle size of 1 mm.

Production of LPG

Using the prepared catalyst, the LPG production reaction was carried out in the same way as Example 1, except that a reaction temperature was 375° C. Gas chromatographic analysis of the product indicated that, after three hours from the beginning of the reaction, a conversion of dimethyl ether was 100%, a conversion of dimethyl ether to carbon monoxide was 4.0%, a conversion of dimethyl ether to carbon dioxide was 0.3%, and a conversion of dimethyl ether to a hydrocarbon was 95.7%. The produced hydrocarbon gas contained propane and butane in 53.4% on the basis of carbon, which consisted of 66.7% of propane and 33.3% of butane on the basis of carbon. A conversion of dimethyl ether to propane and butane was 51.1% on the basis of carbon.

The results are shown in Table 1.

TABLE 1

|  | Example 1 | Example 2 | Example 3 |
| --- | --- | --- | --- |
| Catalyst | Pd-ZSM-5 | Pt-ZSM-5 | Pd/ZSM-5 |
| Reaction temperature (° C.) | 350 | 350 | 375 |
| DME conversion (%) | 100.0 | 100.0 | 100.0 |
| CO yield (%) | 1.4 | 3.0 | 4.0 |
| $CO_2$ yield (%) | 0.4 | 2.4 | 0.3 |
| Hydrocarbon yield (%) | 98.2 | 94.5 | 95.7 |
| Product composition (%) |  |  |  |
| C1(methane) | 1.8 | 3.1 | 5.3 |
| C2(ethane) | 29.2 | 32.7 | 26.6 |
| C3(propane) | 33.4 | 40.6 | 35.6 |
| C4(butane) | 17.3 | 14.1 | 17.8 |
| C5(pentane) | 11.3 | 6.8 | 10.3 |
| C6(hexane) | 7.2 | 2.7 | 4.4 |
| C3 + C4 | 50.6 | 54.7 | 53.4 |
| C3/(C3 + C4) | 65.9 | 74.2 | 66.7 |
| C3 + C4 yield (%) | 49.7 | 51.7 | 51.1 |

The Pd/ZSM-5 in Example 3 has lower catalytic activity than the Pd-ZSM-5 in Example 1, so that it required a higher reaction temperature.

Example 4

Preparation of a Catalyst

A mechanically powdered commercially available Cu—Zn-based methanol synthesis catalyst, C79 produced by Süd Chemie Japan, Inc., (also referred to as "Cu—Zn") and a mechanically powdered commercially available proton-type USY zeolite with a $SiO_2/Al_2O_3$ molar ratio of 12.2, produced by Catalysts & Chemicals Industries Co., Ltd., (also referred to as "USY") were homogeneously mixed with Cu—Zn: USY=1:1 (by weight). And, the mixture was molded by a tablet-compression and sized to give a granular catalyst for producing a liquefied petroleum gas having an average particle size of 1 mm.

Production of LPG

Using the prepared catalyst, the LPG production reaction was carried out in the same way as Example 1, except that a reaction temperature was 340° C. Gas chromatographic analysis of the product indicated that, after three hours from the beginning of the reaction, a conversion of dimethyl ether was 99.9%, a conversion of dimethyl ether to carbon monoxide was 15.0%, a conversion of dimethyl ether to carbon dioxide was 16.0%, and a conversion of dimethyl ether to a hydrocarbon was 68.9%. The produced hydrocarbon gas contained propane and butane in 75.5% on the basis of carbon, which consisted of 26.1% of propane and 73.9% of butane on the basis of carbon. A conversion of dimethyl ether to propane and butane was 52.0% on the basis of carbon.

The results are shown in Table 2.

Example 5

Preparation of a Catalyst

A mechanically powdered commercially available Cu—Zn-based methanol synthesis catalyst, C79 produced by Süd Chemie Japan, Inc., (also referred to as "Cu—Zn") and a mechanically powdered commercially available proton-type β-zeolite with a $SiO_2/Al_2O_3$ molar ratio of 37.1, produced by Tosoh Corporation, were homogeneously mixed with Cu—Zn: β-zeolite=1:1 (by weight). And, the mixture was molded by a tablet-compression and sized to give a granular catalyst for producing a liquefied petroleum gas having an average particle size of 1 mm.

Production of LPG

Using the prepared catalyst, the LPG production reaction was carried out in the same way as Example 1. Gas chromatographic analysis of the product indicated that, after three hours from the beginning of the reaction, a conversion of dimethyl ether was 100%, a conversion of dimethyl ether to carbon monoxide was 12.8%, a conversion of dimethyl ether to carbon dioxide was 19.7%, and a conversion of dimethyl ether to a hydrocarbon was 67.5%. The produced hydrocarbon gas contained propane and butane in 67.2% on the basis of carbon, which consisted of 24.3% of propane and 75.7% of butane on the basis of carbon. A conversion of dimethyl ether to propane and butane was 45.4% on the basis of carbon.

The results are shown in Table 2.

Example 6

Preparation of a Catalyst 4 wt % Pd and 0.75 wt % Ca supported silica (Pd—Ca/$SiO_2$) was prepared as follows.

The silica, which is a support, was CARiACT G3 (trade name), produced by Fuji Silysia Chemical Ltd.

First, the silica, which is a support, was pulverized to 20 to 40 mesh, sized and dried. And then, 8.8 mL of a 50 mg/mL aqueous solution of $Pd(NO_3)_2(NH_3)_2$ was added drop by drop to 20 g of the silica. After sufficiently impregnating the solution into pores, the silica was dried in a drying machine at 120° C. for 12 hours. The process of impregnation and drying was repeated two more times to obtain a silica-supported Pd catalyst.

Next, 3.0 mL of a 25 mg/mL aqueous solution of Ca(NO$_3$)$_2$ was added drop by drop to the silica-supported Pd catalyst. After sufficiently impregnating the solution into pores, the catalyst was dried in a drying machine at 120° C. for 12 hours. The process of impregnation and drying was repeated two more times.

Then, the silica impregnated with Pd and Ca was calcined at 450° C. in the atmosphere for 8 hours. Subsequently, it was mechanically pulverized to give a Pd—Ca/SiO$_2$.

The Pd—Ca/SiO$_2$ thus prepared and a mechanically powdered commercially available proton-type β-zeolite with a SiO$_2$/Al$_2$O$_3$ molar ratio of 37.1, produced by Tosoh Corporation, were homogeneously mixed with Pd—Ca/SiO$_2$: β-zeolite=2:1 (by weight). And, the mixture was molded by a tablet-compression and sized to give a granular catalyst for producing a liquefied petroleum gas having an average particle size of 1 mm.

Production of LPG

Using the prepared catalyst, the LPG production reaction was carried out in the same way as Example 1. Gas chromatographic analysis of the product indicated that, after three hours from the beginning of the reaction, a conversion of dimethyl ether was 100%, a conversion of dimethyl ether to carbon monoxide was 17.1%, a conversion of dimethyl ether to carbon dioxide was 18.5%, and a conversion of dimethyl ether to a hydrocarbon was 64.3%. The produced hydrocarbon gas contained propane and butane in 71.5% on the basis of carbon, which consisted of 29.0% of propane and 71.0% of butane on the basis of carbon. A conversion of dimethyl ether to propane and butane was 46.0% on the basis of carbon.

The results are shown in Table 2.

TABLE 2

|  | Example 4 | Example 5 | Example 6 |
|---|---|---|---|
| Catalyst | Cu—Zn USY | Cu—Zn β-zeolite | Pd—Ca/SiO$_2$ β-zeolite |
| Reaction temperature (° C.) | 340 | 350 | 350 |
| DME conversion (%) | 99.9 | 100.0 | 100.0 |
| CO yield (%) | 15.0 | 12.8 | 17.1 |
| CO$_2$ yield (%) | 16.0 | 19.7 | 18.5 |
| Hydrocarbon yield (%) | 68.9 | 67.5 | 64.3 |
| Product composition (%) |  |  |  |
| C1(methane) | 4.4 | 1.8 | 9.3 |
| C2(ethane) | 5.1 | 1.6 | 1.0 |
| C3(propane) | 19.7 | 16.3 | 20.7 |
| C4(butane) | 55.8 | 50.9 | 50.8 |
| C5(pentane) | 10.9 | 13.6 | 10.6 |
| C6(hexane) | 4.1 | 15.8 | 7.5 |
| C3 + C4 | 75.5 | 67.2 | 71.5 |
| C3/(C3 + C4) | 26.1 | 24.3 | 29.0 |
| C3 + C4 yield (%) | 52.0 | 45.4 | 46.0 |

Reference Example 1

Preparation of a Catalyst

A mechanically powdered commercially available Cu—Zn-based methanol synthesis catalyst, C79 produced by Süd Chemie Japan, Inc., (also referred to as "Cu—Zn") and a mechanically powdered proton-type ZSM-5 with a Si/Al ratio (atomic ratio) of 20, produced by Tosoh Corporation, were homogeneously mixed with Cu—Zn: ZSM-5=1:1 (by weight). And, the mixture was molded by a tablet-compression and sized to give a granular catalyst for producing a liquefied petroleum gas having an average particle size of 1 mm.

Production of LPG

Using the prepared catalyst, the LPG production reaction was carried out in the same way as Example 1. Gas chromatographic analysis of the product indicated that, after three hours from the beginning of the reaction, a conversion of dimethyl ether was 99.6%, a conversion of dimethyl ether to carbon monoxide was 28.3%, a conversion of dimethyl ether to carbon dioxide was 13.9%, and a conversion of dimethyl ether to a hydrocarbon was 57.3%. The produced hydrocarbon gas contained propane and butane in 52.7% on the basis of carbon, which consisted of 71.5% of propane and 28.5% of butane on the basis of carbon. A conversion of dimethyl ether to propane and butane was 30.2% on the basis of carbon.

The results are shown in Table 3.

Reference Example 2

Preparation of a Catalyst

Pd—Ca/SiO$_2$ prepared in the same way as Example 6 and a mechanically powdered proton-type ZSM-5 with a Si/Al ratio (atomic ratio) of 20, produced by Tosoh Corporation, were homogeneously mixed with Pd—Ca/SiO$_2$: ZSM-5=2:1 (by weight). And, the mixture was molded by a tablet-compression and sized to give a granular catalyst for producing a liquefied petroleum gas having an average particle size of 1 mm.

Production of LPG

Using the prepared catalyst, the LPG production reaction was carried out in the same way as Example 1. Gas chromatographic analysis of the product indicated that, after three hours from the beginning of the reaction, a conversion of dimethyl ether was 100%, a conversion of dimethyl ether to carbon monoxide was 17.6%, a conversion of dimethyl ether to carbon dioxide was 19.0%, and a conversion of dimethyl ether to a hydrocarbon was 63.3%. The produced hydrocarbon gas contained propane and butane in 59.1% on the basis of carbon, which consisted of 66.7% of propane and 33.3% of butane on the basis of carbon. A conversion of dimethyl ether to propane and butane was 37.4% on the basis of carbon.

The results are shown in Table 3.

TABLE 3

|  | Reference Example 1 | Reference Example 2 |
|---|---|---|
| Catalyst | Cu—Zn ZSM-5 | Pd—Ca/SiO$_2$ ZSM-5 |
| Reaction temperature (° C.) | 350 | 350 |
| DME conversion (%) | 99.6 | 100.0 |
| CO yield (%) | 28.3 | 17.6 |
| CO$_2$ yield (%) | 13.9 | 19.0 |
| Hydrocarbon yield (%) | 57.3 | 63.3 |
| Product composition (%) |  |  |
| C1(methane) | 2.6 | 11.8 |
| C2(ethane) | 18.2 | 12.5 |
| C3(propane) | 37.7 | 39.5 |
| C4(butane) | 15.0 | 19.7 |
| C5(pentane) | 9.5 | 9.4 |
| C6(hexane) | 17.1 | 7.1 |
| C3 + C4 | 52.7 | 59.1 |
| C3/(C3 + C4) | 71.5 | 66.7 |
| C3 + C4 yield (%) | 30.2 | 37.4 |

Example 7

Production of LPG

Using the catalyst prepared in the same way as Example 1 (Pd-ZSM-5), the LPG production reaction was carried out in the same way as Example 1, except that a reaction temperature was 375° C. and a reaction pressure was 0.6 MPa. Gas chromatographic analysis of the product indicated that, after three hours from the beginning of the reaction, a conversion of dimethyl ether was 100%, a conversion of dimethyl ether to carbon monoxide was 0%, a conversion of dimethyl ether to carbon dioxide was 0%, and a conversion of dimethyl ether to a hydrocarbon was 99.9%. The produced hydrocarbon gas contained propane and butane in 51.4% on the basis of carbon, which consisted of 64.9% of propane and 35.1% of butane on the basis of carbon. A conversion of dimethyl ether to propane and butane was 51.4% on the basis of carbon.

The results are shown in Table 4.

Example 8

Production of LPG

The LPG production reaction was carried out in the same way as Example 7, except that a reaction pressure was 1.1 MPa. Gas chromatographic analysis of the product indicated that, after three hours from the beginning of the reaction, a conversion of dimethyl ether was 100%, a conversion of dimethyl ether to carbon monoxide was 0%, a conversion of dimethyl ether to carbon dioxide was 0%, and a conversion of dimethyl ether to a hydrocarbon was 100%. The produced hydrocarbon gas contained propane and butane in 52.0% on the basis of carbon, which consisted of 62.5% of propane and 37.5% of butane on the basis of carbon. A conversion of dimethyl ether to propane and butane was 52.0% on the basis of carbon.

The results are shown in Table 4.

Example 9

Production of LPG

The LPG production reaction was carried out in the same way as Example 7, except that a reaction pressure was 1.6 MPa. Gas chromatographic analysis of the product indicated that, after three hours from the beginning of the reaction, a conversion of dimethyl ether was 100%, a conversion of dimethyl ether to carbon monoxide was 0.7%, a conversion of dimethyl ether to carbon dioxide was 0.1%, and a conversion of dimethyl ether to a hydrocarbon was 99.2%. The produced hydrocarbon gas contained propane and butane in 51.7% on the basis of carbon, which consisted of 60.2% of propane and 39.8% of butane on the basis of carbon. A conversion of dimethyl ether to propane and butane was 51.2% on the basis of carbon.

The results are shown in Table 4.

Example 10

Production of LPG

The LPG production reaction was carried out in the same way as Example 7, except that a reaction pressure was 2.1 MPa. Gas chromatographic analysis of the product indicated that, after three hours from the beginning of the reaction, a conversion of dimethyl ether was 100%, a conversion of dimethyl ether to carbon monoxide was 0.5%, a conversion of dimethyl ether to carbon dioxide was 0.5%, and a conversion of dimethyl ether to a hydrocarbon was 99.0%. The produced hydrocarbon gas contained propane and butane in 51.1% on the basis of carbon, which consisted of 63.3% of propane and 36.7% of butane on the basis of carbon. A conversion of dimethyl ether to propane and butane was 50.6% on the basis of carbon.

The results are shown in Table 4.

Example 11

(Production of LPG)

The LPG production reaction was carried out in the same way as Example 7, except that a reaction pressure was 2.6 MPa. Gas chromatographic analysis of the product indicated that, after three hours from the beginning of the reaction, a conversion of dimethyl ether was 100%, a conversion of dimethyl ether to carbon monoxide was 5.4%, a conversion of dimethyl ether to carbon dioxide was 0.6%, and a conversion of dimethyl ether to a hydrocarbon was 94.0%. The produced hydrocarbon gas contained propane and butane in 52.5% on the basis of carbon, which consisted of 68.7% of propane and 31.3% of butane on the basis of carbon. A conversion of dimethyl ether to propane and butane was 49.3% on the basis of carbon.

The results are shown in Table 4.

TABLE 4

|  | Example 7 | Example 8 | Example 9 | Example 10 | Example 11 |
| --- | --- | --- | --- | --- | --- |
| Reaction pressure (MPa) | 0.6 | 1.1 | 1.6 | 2.1 | 2.6 |
| DME conversion (%) | 100.0 | 100.0 | 100.0 | 100.0 | 100.0 |
| CO yield (%) | 0.0 | 0.0 | 0.7 | 0.5 | 5.4 |
| $CO_2$ yield (%) | 0.0 | 0.0 | 0.1 | 0.5 | 0.6 |
| Hydrocarbon yield (%) | 99.9 | 100.0 | 99.2 | 99.0 | 94.0 |
| Product composition (%) | | | | | |
| C1(methane) | 2.1 | 2.6 | 1.4 | 4.1 | 16.0 |
| C2(ethane) | 27.4 | 28.5 | 28.9 | 27.6 | 20.0 |
| C3(propane) | 33.4 | 32.5 | 31.1 | 32.4 | 36.0 |
| C4(butane) | 18.1 | 19.5 | 20.6 | 18.8 | 16.4 |
| C5(pentane) | 6.6 | 7.7 | 10.7 | 11.6 | 8.0 |
| C6(hexane) | 12.5 | 9.3 | 7.3 | 5.6 | 3.5 |
| C3 + C4 | 51.4 | 52.0 | 51.7 | 51.1 | 52.5 |
| C3/(C3 + C4) | 64.9 | 62.5 | 60.2 | 63.3 | 68.7 |
| C3 + C4 yield (%) | 51.4 | 52.0 | 51.2 | 50.6 | 49.3 |

Example 12

Production of LPG

Using the catalyst prepared in the same way as Example 1 (Pd-ZSM-5), the LPG production reaction was carried out in the same way as Example 1, except that a reaction temperature was 375° C. Gas chromatographic analysis of the product indicated that, after three hours from the beginning of the reaction, a conversion of dimethyl ether was 100%, a conversion of dimethyl ether to carbon monoxide was 0.5%, a conversion of dimethyl ether to carbon dioxide was 0.2%, and a conversion of dimethyl ether to a hydrocarbon was 99.2%. The produced hydrocarbon gas contained propane and butane in 50.9% on the basis of carbon, which consisted of 58.3% of propane and 41.7% of butane on the basis of carbon. A conversion of dimethyl ether to propane and butane was 50.5% on the basis of carbon.

The results are shown in Table 5.

Example 13

Preparation of a Catalyst

A catalyst for producing a liquefied petroleum gas was prepared in the same way as Example 1, except that the amount of supported Pd was 0.2 wt %.

(Production of LPG)

Using the prepared catalyst, the LPG production reaction was carried out in the same way as Example 12. Gas chromatographic analysis of the product indicated that, after three hours from the beginning of the reaction, a conversion of dimethyl ether was 100%, a conversion of dimethyl ether to carbon monoxide was 0.2%, a conversion of dimethyl ether to carbon dioxide was 0.2%, and a conversion of dimethyl ether to a hydrocarbon was 99.6%. The produced hydrocarbon gas contained propane and butane in 48.4% on the basis of carbon, which consisted of 58.0% of propane and 42.0% of butane on the basis of carbon. A conversion of dimethyl ether to propane and butane was 48.2% on the basis of carbon.

The results are shown in Table 5.

Example 14

Preparation of a Catalyst

A catalyst for producing a liquefied petroleum gas was prepared in the same way as Example 1, except that the amount of supported Pd was 0.1 wt %.

Production of LPG

Using the prepared catalyst, the LPG production reaction was carried out in the same way as Example 12. Gas chromatographic analysis of the product indicated that, after three hours from the beginning of the reaction, a conversion of dimethyl ether was 99.6%, a conversion of dimethyl ether to carbon monoxide was 0.8%, a conversion of dimethyl ether to carbon dioxide was 0.1%, and a conversion of dimethyl ether to a hydrocarbon was 99.1%. The produced hydrocarbon gas contained propane and butane in 51.4% on the basis of carbon, which consisted of 57.0% of propane and 43.0% of butane on the basis of carbon. A conversion of dimethyl ether to propane and butane was 50.9% on the basis of carbon.

The results are shown in Table 5.

TABLE 5

| | Example 12 | Example 13 | Example 14 |
|---|---|---|---|
| Catalyst | Pd-ZSM-5 | Pd-ZSM-5 | Pd-ZSM-5 |
| Amount of Supported Pd (wt %) | 0.5 | 0.2 | 0.1 |
| DME conversion (%) | 100.0 | 100.0 | 99.6 |
| CO yield (%) | 0.5 | 0.2 | 0.8 |
| $CO_2$ yield (%) | 0.2 | 0.2 | 0.1 |
| Hydrocarbon yield (%) | 99.2 | 99.6 | 99.1 |
| Product composition (%) | | | |
| C1(methane) | 2.1 | 2.2 | 1.8 |
| C2(ethane) | 27.6 | 25.8 | 23.7 |
| C3(propane) | 29.7 | 28.0 | 29.3 |
| C4(butane) | 21.2 | 20.3 | 22.1 |
| C5(pentane) | 12.6 | 14.2 | 11.5 |
| C6(hexane) | 5.8 | 7.9 | 9.2 |
| C7(heptane) | 1.0 | 1.5 | 2.4 |
| C3 + C4 | 50.9 | 48.4 | 51.4 |
| C3/(C3 + C4) | 58.3 | 58.0 | 57.0 |
| C3 + C4 yield (%) | 50.5 | 48.2 | 50.9 |

Example 15

Production of LPG

Using the catalyst prepared in the same way as Example 3 (Pd/ZSM-5), the LPG production reaction was carried out in the same way as Example 1, except that a reaction temperature was 375° C. Gas chromatographic analysis of the product indicated that, after three hours from the beginning of the reaction, a conversion of dimethyl ether was 100%, a conversion of dimethyl ether to carbon monoxide was 4.0%, a conversion of dimethyl ether to carbon dioxide was 0.3%, and a conversion of dimethyl ether to a hydrocarbon was 95.7%. The produced hydrocarbon gas contained propane and butane in 53.4% on the basis of carbon, which consisted of 66.7% of propane and 33.3% of butane on the basis of carbon. A conversion of dimethyl ether to propane and butane was 51.1% on the basis of carbon.

The results are shown in Table 6.

Example 16

Preparation of a Catalyst

A catalyst for producing a liquefied petroleum gas was prepared in the same way as Example 3, except that the amount of supported Pd was 0.2 wt %.

Production of LPG

Using the prepared catalyst, the LPG production reaction was carried out in the same way as Example 15. Gas chromatographic analysis of the product indicated that, after three hours from the beginning of the reaction, a conversion of dimethyl ether was 100%, a conversion of dimethyl ether to carbon monoxide was 1.5%, a conversion of dimethyl ether to carbon dioxide was 0.1%, and a conversion of dimethyl ether to a hydrocarbon was 98.4%. The produced hydrocarbon gas contained propane and butane in 52.2% on the basis of carbon, which consisted of 59.8% of propane and 40.2% of butane on the basis of carbon. A conversion of dimethyl ether to propane and butane was 51.4% on the basis of carbon.

The results are shown in Table 6.

TABLE 6

| | Example 15 | Example 16 |
|---|---|---|
| Catalyst | Pd/ZSM-5 | Pd/ZSM-5 |
| Amount of Supported Pd (wt %) | 0.5 | 0.2 |
| DME conversion (%) | 100.0 | 100.0 |
| CO yield (%) | 4.0 | 1.5 |
| $CO_2$ yield (%) | 0.3 | 0.1 |
| Hydrocarbon yield (%) | 95.7 | 98.4 |
| Product composition (%) | | |
| C1(methane) | 5.3 | 1.3 |
| C2(ethane) | 26.6 | 27.6 |
| C3(propane) | 35.6 | 31.2 |
| C4(butane) | 17.8 | 21.0 |
| C5(pentane) | 10.3 | 12.5 |
| C6(hexane) | 3.8 | 5.5 |
| C7(heptane) | 0.6 | 1.0 |
| C3 + C4 | 53.4 | 52.2 |
| C3/(C3 + C4) | 66.7 | 59.8 |
| C3 + C4 yield (%) | 51.1 | 51.4 |

Example 17

Production of LPG

Using the catalyst prepared in the same way as Example 2 (Pt-ZSM-5), the LPG production reaction was carried out in the same way as Example 1, except that a reaction temperature was 375° C. Gas chromatographic analysis of the product indicated that, after three hours from the beginning of the reaction, a conversion of dimethyl ether was 100%, a conversion of dimethyl ether to carbon monoxide was 2.4%, a conversion of dimethyl ether to carbon dioxide was 3.8%, and a conversion of dimethyl ether to a hydrocarbon was 93.8%. The produced hydrocarbon gas contained propane and butane in 53.5% on the basis of carbon, which consisted of 72.7% of propane and 27.3% of butane on the basis of carbon. A conversion of dimethyl ether to propane and butane was 50.2% on the basis of carbon.

The results are shown in Table 7.

Example 18

Preparation of a Catalyst

A catalyst for producing a liquefied petroleum gas was prepared in the same way as Example 2, except that the amount of supported Pt was 0.2 wt %.

Production of LPG

Using the prepared catalyst, the LPG production reaction was carried out in the same way as Example 17. Gas chromatographic analysis of the product indicated that, after three hours from the beginning of the reaction, a conversion of dimethyl ether was 100%, a conversion of dimethyl ether to carbon monoxide was 2.2%, a conversion of dimethyl ether to carbon dioxide was 0.3%, and a conversion of dimethyl ether to a hydrocarbon was 97.6%. The produced hydrocarbon gas contained propane and butane in 49.1% on the basis of carbon, which consisted of 63.5% of propane and 36.5% of butane on the basis of carbon. A conversion of dimethyl ether to propane and butane was 47.9% on the basis of carbon.

The results are shown in Table 7.

Example 19

Preparation of a Catalyst

A catalyst for producing a liquefied petroleum gas was prepared in the same way as Example 2, except that the amount of supported Pt was 0.1 wt %.

Production of LPG

Using the prepared catalyst, the LPG production reaction was carried out in the same way as Example 17. Gas chromatographic analysis of the product indicated that, after three hours from the beginning of the reaction, a conversion of dimethyl ether was 100%, a conversion of dimethyl ether to carbon monoxide was 1.7%, a conversion of dimethyl ether to carbon dioxide was 0.2%, and a conversion of dimethyl ether to a hydrocarbon was 98.1%. The produced hydrocarbon gas contained propane and butane in 51.9% on the basis of carbon, which consisted of 63.0% of propane and 37.0% of butane on the basis of carbon. A conversion of dimethyl ether to propane and butane was 50.9% on the basis of carbon.

The results are shown in Table 7.

TABLE 7

|  | Example 17 | Example 18 | Example 19 |
|---|---|---|---|
| Catalyst | Pt-ZSM-5 | Pt-ZSM-5 | Pt-ZSM-5 |
| Amount of Supported Pt (wt %) | 0.5 | 0.2 | 0.1 |
| DME conversion (%) | 100.0 | 100.0 | 100.0 |
| CO yield (%) | 2.4 | 2.2 | 1.7 |
| $CO_2$ yield (%) | 3.8 | 0.3 | 0.2 |
| Hydrocarbon yield (%) | 93.8 | 97.6 | 98.1 |
| Product composition (%) |  |  |  |
| C1(methane) | 2.8 | 1.6 | 1.6 |
| C2(ethane) | 32.0 | 26.2 | 28.3 |
| C3(propane) | 38.9 | 31.2 | 32.7 |
| C4(butane) | 14.6 | 17.9 | 19.2 |
| C5(pentane) | 7.5 | 10.4 | 9.8 |
| C6(hexane) | 3.4 | 9.0 | 7.0 |
| C7(heptane) | 0.8 | 3.7 | 1.5 |
| C3 + C4 | 53.5 | 49.1 | 51.9 |
| C3/(C3 + C4) | 72.7 | 63.5 | 63.0 |
| C3 + C4 yield (%) | 50.2 | 47.9 | 50.9 |

INDUSTRIAL APPLICABILITY

As described above, according to this invention, a hydrocarbon containing propane or butane as a main component, i.e., a liquefied petroleum gas (LPG) can be economically produced with a high yield from at least one selected from the group consisting of methanol and dimethyl ether.

In addition, according to this invention, a liquefied petroleum gas containing propane or butane as a main component can be produced from a carbon-containing starting material such as a natural gas or a synthesis gas.

What is claimed is:

1. A process for producing a liquefied petroleum gas, comprising the step of:
reacting at least one selected from the group consisting of methanol and dimethyl ether with hydrogen in the presence of a catalyst for producing a liquefied petroleum gas, to produce a liquefied petroleum gas containing propane or butane as a main component; wherein the catalyst for producing a liquefied petroleum gas is a catalyst in which an olefin-hydrogenation catalyst component is supported on a zeolite ZSM-5.

2. The process for producing a liquefied petroleum gas according to claim 1, wherein the total amount of the supported olefin-hydrogenation catalyst component in the catalyst for producing a liquefied petroleum gas is 0.005 to 5% by weight.

3. The process for producing a liquefied petroleum gas according to claim 1, wherein a Si/Al ratio (atomic ratio) of the ZSM-5 is 20 to 100.

4. The process for producing a liquefied petroleum gas according to claim 1, wherein the olefin-hydrogenation catalyst component is at least one selected from the group consisting of Fe, Co, Ni, Cu, Zn, Ru, Rh, Pd, Ir and Pt.

5. The process for producing a liquefied petroleum gas according to claim 4, wherein the olefin-hydrogenation catalyst component is at least one selected from the group consisting of Pd and Pt.

6. The process for producing a liquefied petroleum gas according to claim 5, wherein the total amount of supported Pd and/or Pt in the catalyst for producing a liquefied petroleum gas is 0.005 to 5% by weight.

7. The process for producing a liquefied petroleum gas according to claim 1, wherein a reaction temperature in the reaction of at least one selected from the group consisting of methanol and dimethyl ether, and hydrogen is 300° C. to 470° C.

8. The process for producing a liquefied petroleum gas according to claim 1, wherein a reaction pressure in the reaction of at least one selected from the group consisting of methanol and dimethyl ether, and hydrogen is 0.1 MPa to 3 MPa.

9. A process for producing a liquefied petroleum gas, comprising the steps of:
  (1) feeding a synthesis gas to a catalyst layer comprising a methanol synthesis catalyst, to produce a reactant gas containing methanol and hydrogen by the reaction of carbon monoxide and hydrogen to form methanol; and
  (2) feeding the reactant gas produced in the methanol production step to a catalyst layer comprising a catalyst in which an olefin-hydrogenation catalyst component is supported on a zeolite ZSM-5, to produce a liquefied petroleum gas containing propane or butane as a main component by the reacation of dimethyl ether and hydrogen to form propane and/or butane.

10. A process for producing a liquefied petroleum gas, comprising the steps of:
  (1) feeding a synthesis gas to a catalyst layer comprising a methanol synthesis catalyst and a methanol dehydration catalyst, to produce a reactant gas containing dimethyl ether and hydrogen by the reaction of carbon monoxide and hydrogen to form dimethyl ether; and
  (2) feeding the reactant gas produced in the dimethyl ether production step to a catalyst layer comprising a catalyst in which an olefin-hydrogenation catalyst component is supported by a zeolite ZSM-5, to produce a liquefied petroleum gas containing propane or butane as a main component by the reaction of dimethyl ether and hydrogen to form propane and/or butane.

11. A process for producing a liquefied petroleum gas, comprising the steps of:
  (1) producing a synthesis gas from a carbon-containing starting material and at least one selected from the group consisting of $H_2O$, $O_2$ and $CO_2$;
  (2) feeding the synthesis gas to a catalyst layer comprising a methanol synthesis catalyst, to produce a reactant gas containing methanol and hydrogen by the reaction of carbon monoxide and hydrogen to form methanol; and
  (3) feeding the reactant gas produced in the methanol production step to a catalyst layer comprising a catalyst in which an olefin-hydrogenation catalyst component is supported by a zeolite ZSM-5, to produce a liquefied petroleum gas containing propane or butane as a main component by the reaction of methanol and hydrogen to form propane and/or butane.

12. A process for producing a liquefied petroleum gas, comprising the steps of:
  (1) producing a synthesis gas from a carbon-containing starting material and at least one selected from the group consisting of $H_2O$, $O_2$ and $CO_2$;
  (2) feeding the synthesis gas to a catalyst layer comprising a methanol synthesis catalyst and a methanol dehydration catalyst, to produce a reactant gas containing dimethyl ether and hydrogen by the reaction of carbon monoxide and hydrogen to form dimethyl ether; and
  (3) feeding the reactant gas produced in the dimethyl ether production step to a catalyst layer comprising a catalyst in which an olefin-hydrogenation catalyst component is supported by a zeolite ZSM-5, to produce a liquefied petroleum gas containing propane or butane as a main component by the reaction of dimethyl ether and hydrogen to form propane and/or butane.

* * * * *

UNITED STATES PATENT AND TRADEMARK OFFICE
CERTIFICATE OF CORRECTION

PATENT NO. : 7,432,410 B2  Page 1 of 1
APPLICATION NO. : 10/929987
DATED : October 7, 2008
INVENTOR(S) : Asami et al.

It is certified that error appears in the above-identified patent and that said Letters Patent is hereby corrected as shown below:

At column 27, line 19, in Claim 9, please delete "reacation" and insert therefore, --reaction--.

At column 27, line 19, in Claim 9, please delete "dimethyl ether" and insert therefore, --methanol--.

Signed and Sealed this

Thirty-first Day of August, 2010

David J. Kappos
*Director of the United States Patent and Trademark Office*